(12) United States Patent
Lee

(10) Patent No.: US 7,920,174 B2
(45) Date of Patent: Apr. 5, 2011

(54) METHOD AND DEVICE FOR OUTPUTTING PIXEL DATA WITH APPENDED DATA

(75) Inventor: Jeong-Eun Lee, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 471 days.

(21) Appl. No.: 12/095,492

(22) PCT Filed: Nov. 27, 2006

(86) PCT No.: PCT/KR2006/005025
§ 371 (c)(1),
(2), (4) Date: May 29, 2008

(87) PCT Pub. No.: WO2007/064119
PCT Pub. Date: Jun. 7, 2007

(65) Prior Publication Data
US 2008/0309781 A1    Dec. 18, 2008

(30) Foreign Application Priority Data

Nov. 30, 2005 (KR) .......................... 10-2005-0115331

(51) Int. Cl.
*H04N 5/228* (2006.01)
(52) U.S. Cl. .............. 348/222.1; 348/207.99; 348/231.3
(58) Field of Classification Search ............... 348/231.3, 348/222.1, 207.99
See application file for complete search history.

(56) References Cited

U.S. PATENT DOCUMENTS

| 5,585,856 | A | 12/1996 | Nakaya et al. |
| 5,920,343 | A | 7/1999 | Watanabe et al. |
| 7,589,767 | B2 * | 9/2009 | Ishibashi et al. ........... 348/231.8 |
| 7,747,074 | B2 | 6/2010 | Yamakado et al. |
| 2002/0080253 | A1 | 6/2002 | Kim |
| 2003/0184652 | A1 * | 10/2003 | Tanaka et al. ............... 348/207.1 |
| 2004/0105129 | A1 * | 6/2004 | Kawakami ..................... 358/2.1 |
| 2004/0227824 | A1 * | 11/2004 | Takahashi ..................... 348/234 |

FOREIGN PATENT DOCUMENTS

| CN | 132032 A | 10/2001 |
| JP | 2005-108137 A | 4/2005 |
| KR | 2002-0032331 | 5/2002 |
| KR | 10-2004-0025136 A | 3/2004 |
| WO | WO 00/10325 A1 | 2/2000 |
| WO | WO 00/13406 A1 | 3/2000 |
| WO | WO-2004/084551 A1 | 9/2004 |

* cited by examiner

*Primary Examiner* — David L Ometz
*Assistant Examiner* — Antoinette T Spinks
(74) *Attorney, Agent, or Firm* — Birch, Stewart, Kolasch & Birch, LLP (57) ABSTRACT

A method and an apparatus for outputting pixel data with appended data are disclosed. An imaging device in accordance with an embodiment of the present invention includes an image sensor, which outputs raw data corresponding to an external image, a memory, which stores the raw data inputted from the image sensor; an output control unit, which adds appended data to the raw data stored in the memory and outputs the added raw data, and an image signal processor, which performs image processing corresponding to at least one of filtering and interpolation of the raw data or the raw data to which the appended data are added. With the present invention, a loss of image data to be displayed can be prevented.

11 Claims, 9 Drawing Sheets

FIG. 1

CONVENTIONAL ART

FIG. 2

CONVENTIONAL ART

| G | B | G | B | G |
|---|---|---|---|---|
| R | G | R | G | R |
| G | B | G | B | G |
| R | G | R | G | R |
| G | B | G | B | G |

METHOD AND DEVICE FOR OUTPUTTING PIXEL DATA WITH APPENDED DATA

CROSS-REFERENCE TO RELATED APPLICATIONS

This application claims foreign priority benefits under 35 U.S.C. .sctn. 119(a)-(d) to PCT/KR2006/005025, filed Nov. 27, 2006, which is hereby incorporated by reference in its entirety.

BACKGROUND

1. Technical Field

The present invention is related to pixel data output, more specifically to a method and an apparatus for outputting pixel data with appended data.

2. Description of the Related Art

By mounting a small or thin imaging device on a small or thin portable terminal, such as a portable phone or a PDA (personal digital assistant), the portable terminal can now function as an imaging device also. Thanks to this new development, the portable terminal, such as the portable phone, can send not only audio information but also visual information. The imaging device has been also mounted on a portable terminal such as the MP3 player, besides the portable phone and PDA. As a result, a variety of portable terminals can now function as an imaging device, capturing an external image and retaining the image as electric data.

Generally, the imaging device uses a solid state imaging device such as a charge-couple device (CCD) image sensor or a complementary metal-oxide semiconductor (CMOS) image sensor.

Figure 1:
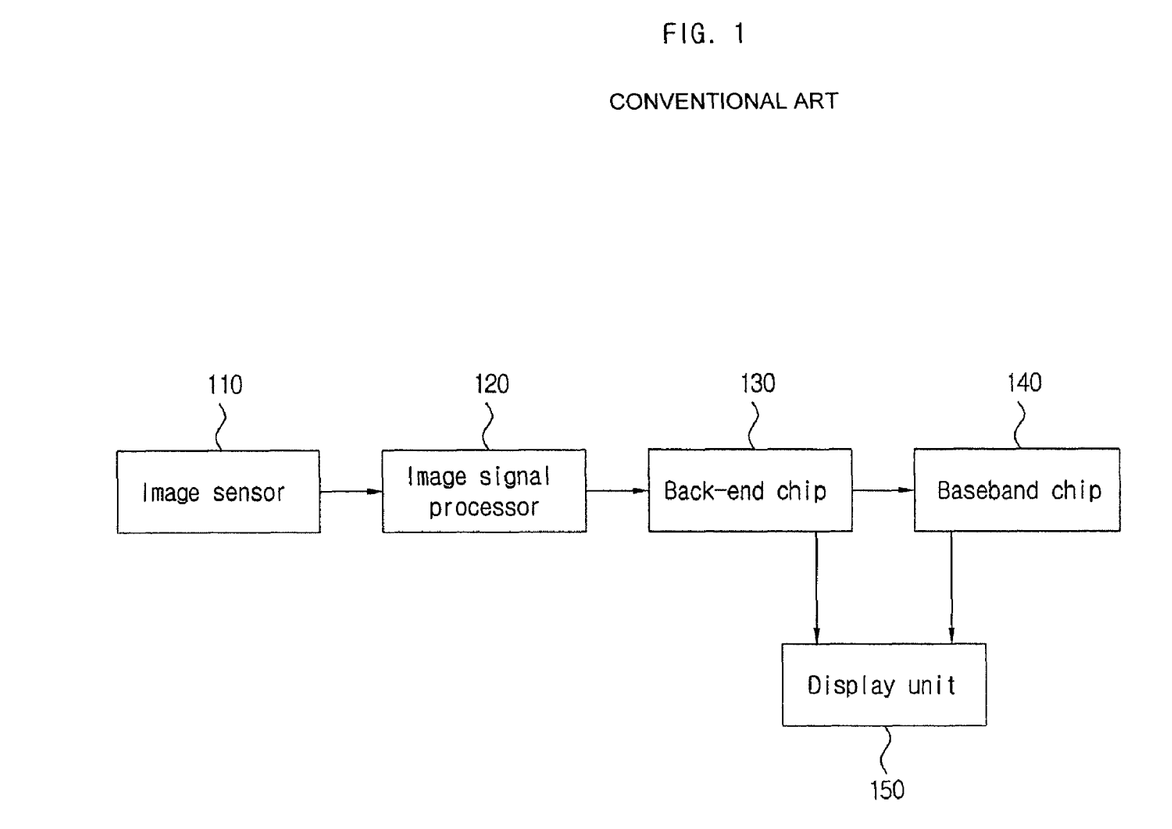
FIG. 1 illustrates a simple structure of a typical imaging device.
Figure 2:
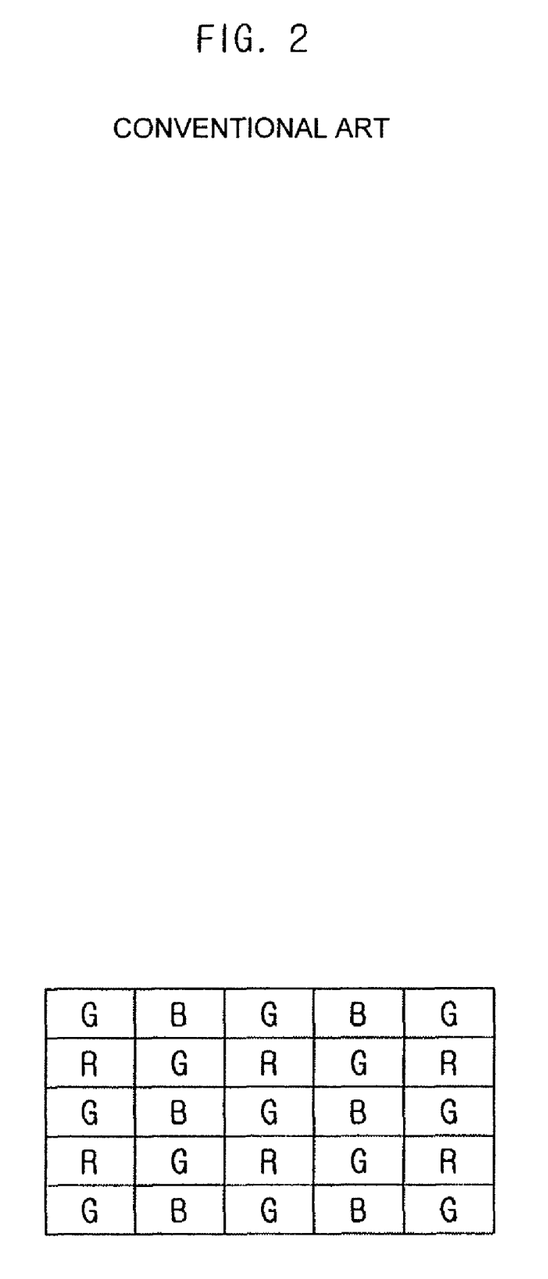
FIG. 2 illustrates general Bayer mosaic filter patterns.

FIG. 1 illustrates a simple structure of a typical imaging device, and FIG. 2 illustrates general Bayer mosaic filter patterns.

As illustrated in FIG. 1, the imaging device, which converts an external image into an electric data and displays the electric data on a display unit 150, includes an image sensor 110, an image signal processor (ISP) 120, a back-end chip 130, a baseband chip 140 and the display unit 150. Besides, the imaging device can further have a memory, storing the converted electric data, and an AD converter, converting an analog signal into a digital signal.

The image sensor 110, which has a Bayer pattern, outputs an electrical signal corresponding to the amount of light inputted through a lens, per unit pixel. To detect the color of an image exposed to the image sensor 110, the pixel of the image sensor 110 is covered by a color filer that absorbs the light wavelength of all colors except for the color of the color filter. Color information is generally extracted by arranging a color filter array on the pixels of the image sensor 110. FIG. 2 illustrates a Bayer mosaic filter, which is the most general type of the color filter array. The Bayer mosaic filter has a checkerboard-like shape and consists of alternating rows of red (R), green (G), and blue (B) filters. The red and green filters are offset to each other such that two green filters cannot share an edge area between an adjacent low and column. Interpolation, based on the color intensity of surrounding pixels, is required to take complete color information of each pixel.

The image signal processor 120 converts raw data inputted from the image sensor 110 into a YUV value and outputs the converted YUV value to the back-end chip 130. Based on the fact that the human eye reacts more sensitively to luminance than to chrominance, the YUV method divides a color into a Y component, which is luminance, and U and V components, which are chrominance. Since the Y component is more sensitive to errors, more bits are coded in the Y component than in the U and V components. A typical Y:U:V ratio is 4:2:2.

By sequentially storing the converted YUV value in FIFO, the image signal processor 120 allows the back-end chip 130 to receive corresponding information.

The back-end chip 130 converts the inputted YUV value to JPEG or BMP through a predetermined encoding method and stores the YUV value in a memory, or decodes the encoded image, stored in the memory, to display on the display unit 150. The back-end chip 130 can also enlarge, reduce or rotate the image. Of course, it is possible, as shown in FIG. 1, that the baseband chip 140 also receives from the back-end chip 130, and display on the display unit, the decoded data.

The baseband chip 140 controls the general operation of the imaging device. For example, once a command to capture an image is received from a user through a key input unit (not shown), the baseband chip 140 can make the back-end chip 130 generate encoded data corresponding to the inputted external image by sending an image generation command to the back-end chip 130.

The display unit 150 displays the decoded data, provided by the control of the back-end chip 130 or the baseband chip 140.

With today's increasing number of pixels and decreasing size of the image sensor 110, it has become insufficient for the captured and outputted raw data to process an image.

That is, since recent image processing technologies include various methods such as the 7×7 interpolation, a lot of appended data are required in the left, right, upper and lower areas to properly output processed raw data to the display unit 150. This is for preventing a loss of real data to be processed and displayed.

The conventional image processing technologies perform an image process regardless of the appended data. Accordingly, the image has not been displayed properly on the display unit, and the left, right, upper and lower borders were lost like a picture frame. This may be because the default appended data is smaller than the data size required for image processing such as the interpolation.

SUMMARY

In order to solve the problems described above, the present invention provides a method and an apparatus for outputting pixel data with appended data that can prevent a loss of image data to be displayed by adding the appended data before image processing.

The present invention also provides a method and an apparatus for outputting pixel data with appended data that can completely reproduce processed data by adding appended data to the left, right, upper and lower areas of raw data inputted from an image sensor.

Other objects of the present invention will become more apparent through the embodiments described below.

To achieve the above objects, an aspect of the present invention features an image processor chip that inputs raw data with appended data into an image signal processor and/or an imaging device including the image processor chip. According to an embodiment of the present invention, the imaging device has an image sensor, outputting raw data corresponding to an external image; a memory, storing the raw data inputted from the image sensor; an output control unit, adding appended data to the raw data stored in the memory and outputting the added raw data; and an image signal processor, performing an image process corresponding to at least one of filtering and interpolation of the raw data or the raw data to which the appended data are added.

The output control unit inputs into the image signal processor the raw data as many as the pixel number of a frame per unit line, whereas k first pixel data of the line, k being a natural number, are added in front of the appended data, added to the raw data, and m last pixel data, m being a natural number, are added in the back of the appended data.

The output control unit inputs into the image signal processor the raw data as many as the pixel number of a frame per unit line, whereas first two pixel data of the line are alternated and added as many as k, k being a natural number, in front of the appended data, added to the raw data, and m last pixel data are alternated and added as many as m, m being a natural number, in the back of the appended data.

The output control unit inputs into the image signal processor the raw data as many as the line number of a frame per unit line, whereas k first pixel data of the line, k being a natural number, are added in front of the appended data, added to the raw data, and m last pixel data, m being a natural number, are added in the back of the appended data.

The output control unit inputs into the image signal processor the raw data as many as the line number of a frame per unit line, whereas first two pixel data of the line are alternated and added as many as k, k being a natural number, in front of the appended data, added to the raw data, and m last pixel data are alternated and added as many as m, m being a natural number, in the back of the appended data.

According to another embodiment of the present invention, the imaging device includes a memory, storing raw data inputted from an image sensor; an output control unit, adding appended data to the raw data stored in the memory and outputting the added raw data, and an image signal processor, performing image processing corresponding to at least one of filtering and interpolation of the raw data or the raw data to which the appended data are added.

The output control unit inputs into the image signal processor the raw data as many as the pixel number of a frame per unit line, whereas k first pixel data of the line, k being a natural number, are added in front of the appended data, added to the raw data, and m last pixel data, m being a natural number, are added in the back of the appended data.

The output control unit inputs into the image signal processor the raw data as many as the pixel number of a frame per unit line, whereas first two pixel data of the line are alternated and added as many as k, k being a natural number, in front of the appended data, added to the raw data, and m last pixel data are alternated and added as many as m, m being a natural number, in the back of the appended data.

The output control unit inputs into the image signal processor the raw data as many as the line number of a frame per unit line, whereas k first pixel data of the line, k being a natural number, are added in front of the appended data, added to the raw data, and m last pixel data, m being a natural number, are added in the back of the appended data.

The output control unit inputs into the image signal processor the raw data as many as the line number of a frame per unit line, whereas first two pixel data of the line are alternated and added as many as k, k being a natural number, in front of the appended data, added to the raw data, and m last pixel data are alternated and added as many as m, m being a natural number, in the back of the appended data.

According to another embodiment of the present invention, the image processor chip for an imaging device includes a memory, storing raw data inputted from an image sensor; an output control unit adding appended data to the raw data stored in the memory and outputting the added raw data; and an image signal processor, performing image processing corresponding to at least one of filtering and interpolation of the raw data or the raw data to which the appended data are added, whereas, when inputting per unit line the raw data into the image processing unit, the output control unit inputs first appended data in front of the raw data and second appended data in the back of the raw data.

DETAILED DESCRIPTION

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

Figure 3:
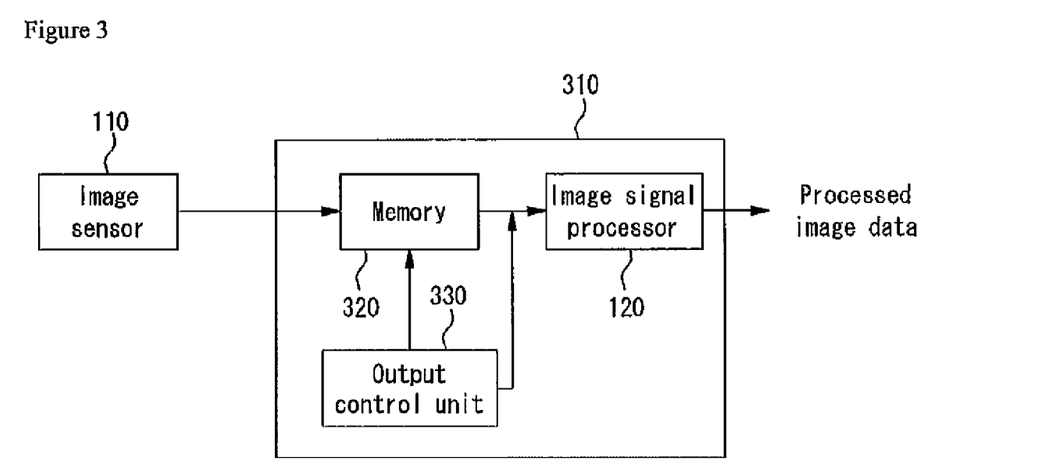
FIG. 3 is a block diagram illustrating a simple structure of an image processing unit in accordance with an embodiment of the present invention.
Figure 4:
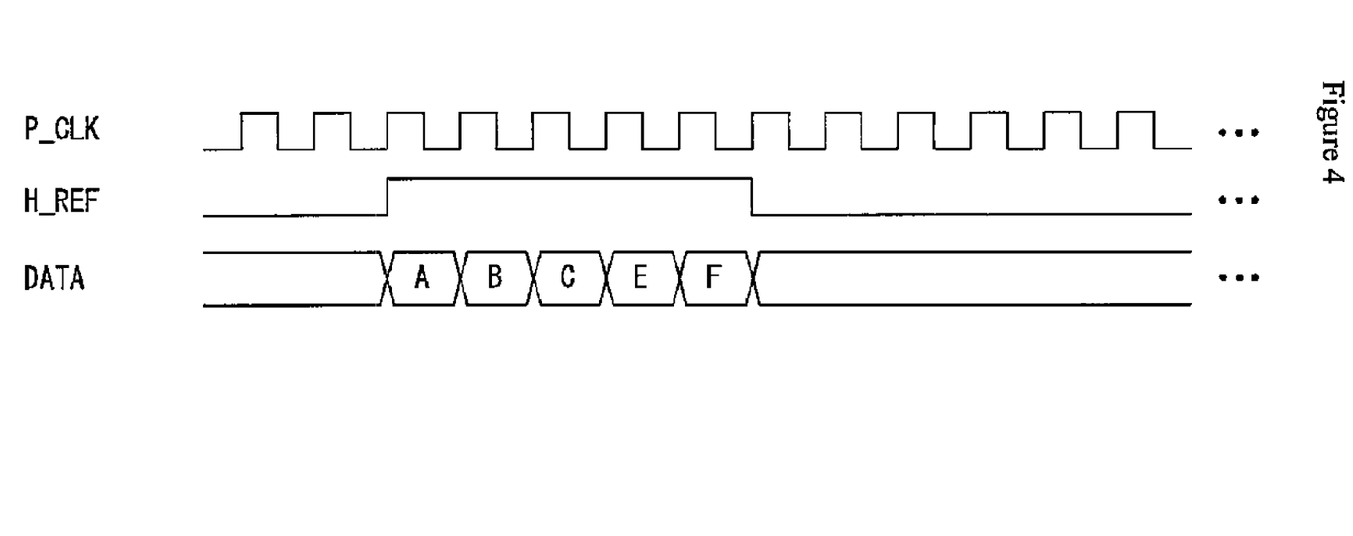
FIG. 4 illustrates signal types for which a horizontal input signal is inputted from an image sensor in accordance with an embodiment of the present invention.
Figure 5:
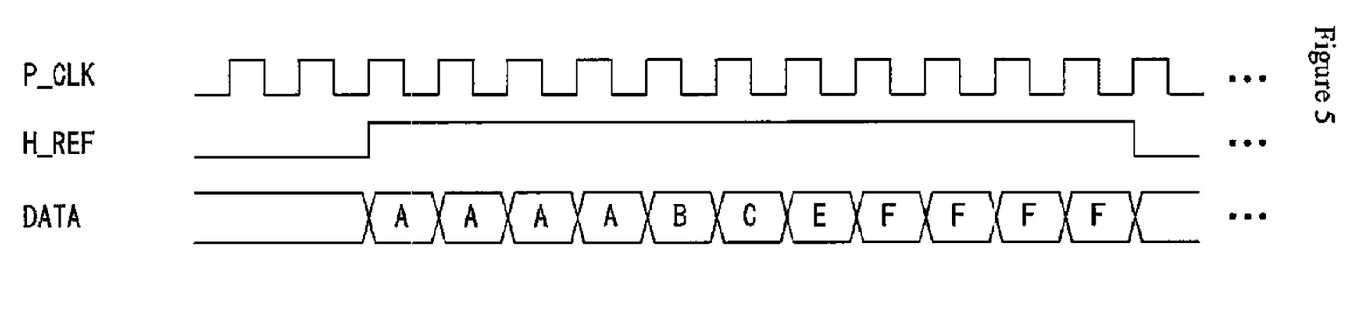
FIG. 5 and FIG. 6 illustrate signal types for which a horizontal input signal is inputted into an image signal processor in accordance with an embodiment of the present invention.
Figure 6:
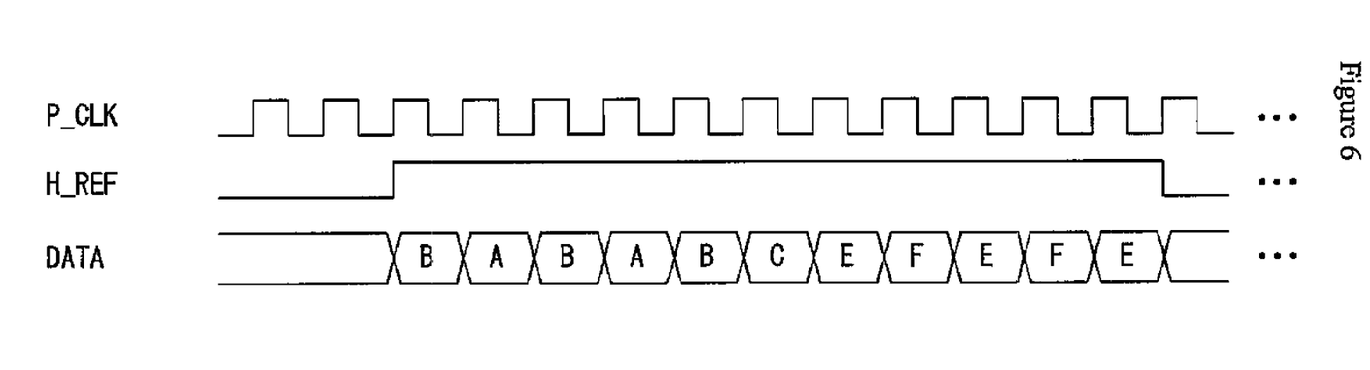
Figure 7:
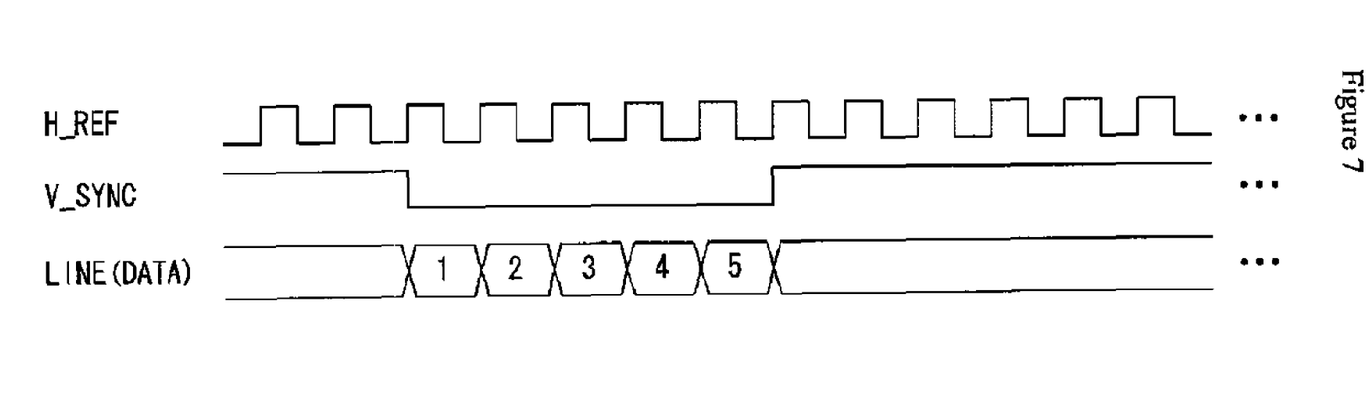
FIG. 7 illustrates signal types for which a vertical input signal is inputted from an image sensor in accordance with an embodiment of the present invention.
Figure 8:
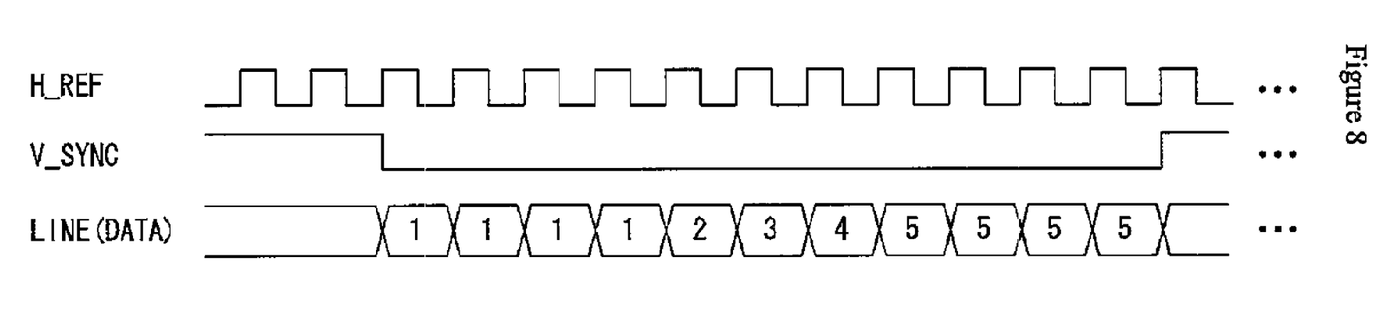
FIG. 8 and FIG. 9 illustrate signal types for which a vertical input signal is inputted into an image signal processor in accordance with an embodiment of the present invention.
Figure 9:
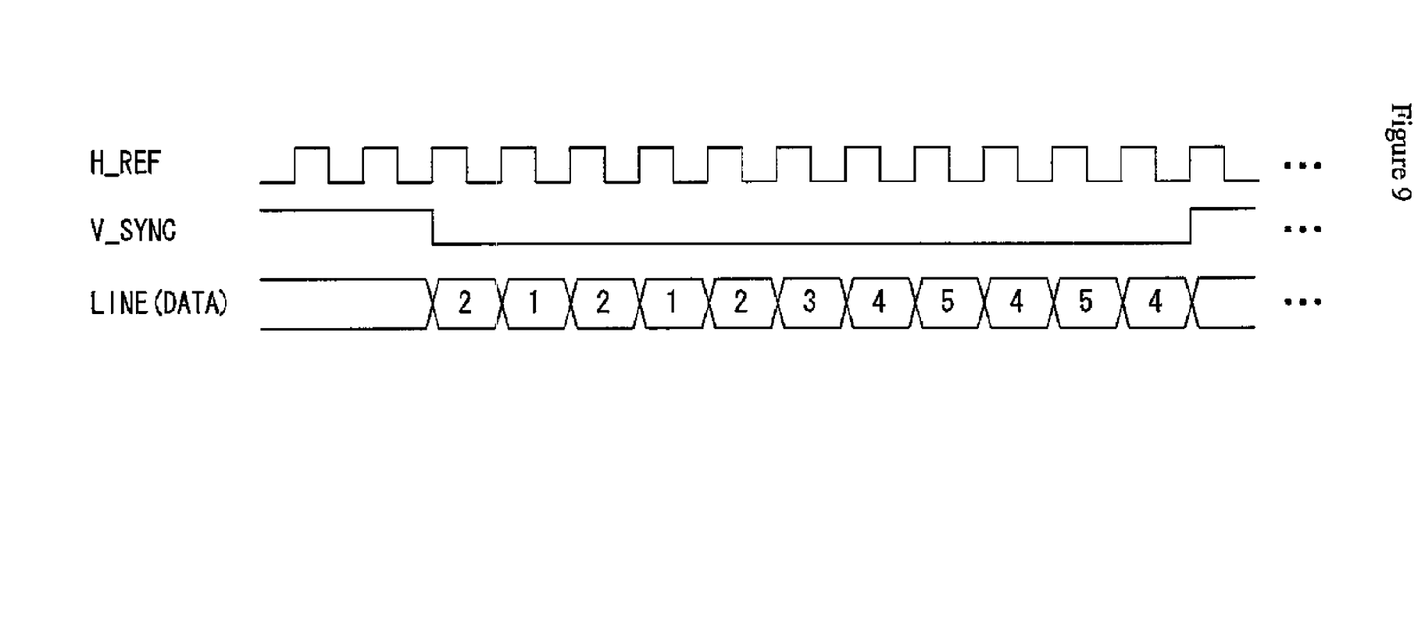

FIG. 3 is a block diagram illustrating a simple structure of an image processing unit in accordance with an embodiment of the present invention, and FIG. 4 illustrates signal types for which a horizontal input signal is inputted from an image sensor in accordance with the embodiment of the present invention. FIG. 5 and FIG. 6 illustrate signal types for which a horizontal input signal is inputted into the image signal processor in accordance with the embodiment of the present invention. FIG. 7 illustrates signal types for which a vertical input signal is inputted from the image sensor in accordance with the embodiment of the present invention. FIG. 8 and FIG. 9 illustrate signal types for which a vertical input signal is inputted into the image signal processor in accordance with the embodiment of the present invention.

As illustrated in FIG. 3, an image processing unit 310 in accordance with the present invention includes an image signal processor 120, a memory 320 and an output control unit 330. The image processing unit 310 can be formed as a single chip.

The image signal processor 120 receives and processes raw data, inputted from the image sensor 110 and stored in the memory 320, and transfers the processed image data to the back-end chip 130. The image signal processor 120, for example, can convert the raw data, inputted from the image sensor, into YUV data to output the converted YUV data.

In case that the image signal processor 120 further has an encoding unit (e.g. a JPEG encoder), the image signal processor 120 can output the JPEG encoded data to the back-end chip 130.

The memory 320 accumulates the raw data inputted from the image sensor 110. The memory 320 can consist of n line memories, n being a natural number (e.g. between 1 and the line number, inclusive, of one frame). For example, in the case of including two line memories, the raw data of odd lines of a particular frame can be successively accumulated in a first line memory, and the raw data of even lines of the frame can be successively accumulated in a second line memory. At this time, the raw data for a new line can be overwrite the previously stored data. In this case, the previously written data shall be read by the output control unit 330 and inputted into the image signal processor 120 before the new raw data are overwritten thereon.

FIG. 4 illustrates signal types for which a horizontal input signal is inputted from the image sensor 110, and FIG. 7 illustrates signal types for which a vertical input signal is inputted from the image sensor 110.

In FIG. 4, P_CLK represents a clock signal; H_REF represents a valid horizontal line signal, and DATA shows an output state of the raw data. The raw data for one pixel is inputted at every cycle of P_CLK. While the H_REF signal is high (or low depending on the embodiment type), the raw data of the pixel number corresponding to a line of frame are inputted. For example, it is assumed that the inputted raw data are A, B, C, E and F.

In FIG. 7, H_REF represents a valid vertical line signal; V_SYNC represents a valid vertical line signal, and DATA (line) shows an output state of the raw data of each line unit. The raw data for one line is inputted at every circle of H_REF (or every section where the H_REF signal is high). While the V_SYNC signal is low (or high depending on the embodiment type), the raw data corresponding to the line number of a frame are inputted. For example, it is assumed that the lines of the inputted raw data are 1, 2, 3, 4 and 5.

The output control unit 330 reads the raw data written in the memory 320 for each line or pixel and inputs into the image signal processor 120 the read raw data of a format in which the appended data is added. The output control unit 330 can be included in the image signal processor 120.

As illustrated in FIG. 5, when the output control unit 330 inputs into the image signal processor 120 the raw data corresponding to a line, the output control unit 330 can add k first pixel data, k being a natural number, in front of the raw data and m last pixel data, m being a natural number, in the back of the raw data. Here, k and m can be identical to or different from each other, and can be preset or set by a user. In case that the raw data A, B, C, E and F are inputted from the image sensor 110 and k and m, respectively, are set as 3, for example, the output control unit 330 can successively input the raw data A, A, A, A, B, C, E, F, F, F and F into the image signal processor 120.

Alternatively, as illustrated in FIG. 6, when the output control unit 330 inputs into the image signal processor 120 the raw data corresponding to a line, the output control unit 330 can alternate and add first pixel data and second pixel data as many as k, k being a natural number, in front of the raw data and last two pixel data as many as m, m being a natural number, in the back of the raw data. Here, k and m can be identical to or different from each other, and can be preset or set by a user. For example, in case that the raw data A, B, C, E and F are inputted from the image sensor 110 and k and m, respectively, are set as 3, the output control unit 330 can successively input the raw data B, A, B, A, B, C, E, F, E, F and E into the image signal processor 120.

The output mode of the horizontal input signal of the above-described two types can be determined by the mode of an input signal that the image signal processor 120 can process. For example, the second type can be suitable for the image signal processor processing Bayer pattern raw data. Of course, it is evident that other data output methods can be considered.

As illustrated in FIG. 8, when the output control unit 330 inputs into the image signal processor 120 the raw data as many as the number of lines, the output control unit 330 can add p pixel data, p being a natural number, in front of the raw data and q pixel data, q being a natural number, in the back of the raw data. Here, p and q can be identical to or different from each other, and can be preset or set by a user. For example, in case that the raw data 1, 2, 3, 4 and 5 are inputted from the image sensor 110 and p and q, respectively, are set as 3, the output control unit 330 can successively input the raw data 1, 1, 1, 1, 2, 3, 4, 5, 5, 5 and 5 into the image signal processor 120.

As illustrated in FIG. 9, when the output control unit 330 inputs into the image signal processor 120 the raw data as many as the number of lines, the output control unit 330 can alternate and add first two pixel data as many as p, p being a natural number, in front of the raw data and last two pixel data as many as q, q being a natural number, in the back of the raw data by alternating pixel data of the last two lines. Here, p and q can be identical to or different from each other, and can be preset or set by a user. In case that the raw data 1, 2, 3, 4 and 5 are inputted from the image sensor 110 and p and q, respectively, are set as 3, for example, the output control unit 330 can successively input the raw data 2, 1, 2, 1, 2, 3, 4, 5, 4, 5 and 4 into the image signal processor 120.

The output mode of the vertical input signal of the above-described two types can be determined by the mode of an input signal that the image signal processor 120 can process. For example, the second type can be suitable for the image signal processor 120 processing Bayer pattern raw data. Of course, it is evident that other data output methods can be considered.

In each of the above-described embodiments, the raw data, which are k or p pixel data added in front of the raw data and m or q pixel data added in the back of the raw data, are used as the appended data, functioning to prevent image distortion caused by improper removal of necessary data when processing the data to be displayed. Here, k, m, p and q can have the same value.

Accordingly, assuming that a frame has the size of a×b, the raw data of the size of (a+k+m)×(b+p+q) are inputted into the image signal processor 120.

As such, a processed image can be properly displayed by repeating or alternately adding the appended data to the left, right, upper and lower areas of the raw data.

As described above, the apparatus for outputting pixel data with appended data in accordance with the present invention can prevent a loss of image data to be displayed by adding the appended data before image processing.

The present invention also can completely reproduce processed data by adding appended data to the left, right, upper and lower areas of raw data inputted from an image sensor.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. An imaging device, comprising:
    an image sensor, outputting raw data corresponding to an external image;
    a memory, storing the raw data inputted from the image sensor;
    an output control unit, adding appended data to the raw data stored in the memory and outputting the added raw data; and
    an image signal processor, performing an image process corresponding to at least one of filtering and interpolation of the raw data or the raw data to which the appended data are added,
    output control unit adds some pixel data of the line in front of the raw data and some pixel data of the line in the back of the raw data.

2. The device of claim 1, wherein the output control unit inputs into the image signal processor the raw data as many as the pixel number of a frame per unit line, whereas k first pixel data of the line, k being a natural number, are added in the front of the raw data, and m last pixel data, m being a natural number, are added in the back of the raw data.

3. The device of claim 1, wherein the output control unit inputs into the image signal processor the raw data as many as the pixel number of a frame per unit line, whereas first two pixel data of the line are alternated and added as many as k, k being a natural number, in the front of the raw data, and m last pixel data are alternated and added as many as m, m being a natural number, in the back of the raw data.

4. The device of claim 1, wherein the output control unit inputs into the image signal processor the raw data as many as the line number of a frame per unit line, whereas k first pixel data of the line, k being a natural number, are added in the front of the raw data, and m last pixel data, m being a natural number, are added in the back of the raw data.

5. The device of claim 1, wherein the output control unit inputs into the image signal processor the raw data as many as the line number of a frame per unit line, whereas first two pixel data of the line are alternated and added as many as k, k being a natural number, in the front of the raw data, and m last pixel data are alternated and added as many as m, m being a natural number, in the back of the raw data.

6. An image processor chip for an imaging device, the image processor chip comprising:
    a memory, storing raw data inputted from an image sensor;
    an output control unit, adding appended data to the raw data stored in the memory and outputting the added raw data; and
    an image signal processor, performing image processing corresponding to at least one of filtering and interpolation of the raw data or the raw data to which the appended data are added, whereas, when inputting per unit line the raw data into an image processing unit, the output control unit adds some pixel data of the line in front of the raw data and some pixel data of the line in the back of the raw data.

7. The chip of claim 6, wherein the output control unit inputs into the image signal processor the raw data as many as the pixel number of a frame per unit line,
    whereas k first pixel data of the line, k being a natural number, are added in the front of the raw data, and m last pixel data, m being a natural number, are added in the back of the raw data.

8. The chip of claim 6, wherein the output control unit inputs into the image signal processor the raw data as many as the pixel number of a frame per unit line, whereas first two pixel data of the line are alternated and added as many as k, k being a natural number, in the front of the raw data, and m last pixel data are alternated and added as many as m, m being a natural number, in the back of the raw data.

9. The chip of claim 6, wherein the output control unit input:
    into the image signal processor the raw data as many as the line number of a frame per unit line whereas k first pixel data of the line, k being a natural number, are added in the front of the raw data, and m last pixel data, m being a natural number, are added in the back of the raw data.

10. The chip of claim 6, wherein the output control unit inputs into the image signal processor the raw data as many as the line number of a frame per unit line, whereas first two pixel data of the line are alternated and added as many as k, k being a natural number, in the front of the raw data, and m last pixel data are alternated and added as many as m, m being a natural number, in the back of the raw data.

11. An image processor chip for an imaging device, the image processor chip comprising:
    a memory, storing raw data inputted from an image sensor;

an output control unit, adding appended data to the raw data stored in the memory and outputting the added raw data; and an image signal processor, performing image processing corresponding to at least one of filtering and interpolation of the raw data or the raw data to which the appended data are added, whereas, when inputting per unit line the raw data into an image processing unit, the output control unit inputs first appended data in front of the raw data and second appended data in the back of the raw data.

* * * * *